US008645297B2

(12) United States Patent
Rotondo (10) Patent No.: US 8,645,297 B2
(45) Date of Patent: Feb. 4, 2014

(54) METHOD FOR CONSTRUCTING A TREE OF LINEAR CLASSIFIERS TO PREDICT A QUANTITATIVE VARIABLE

(75) Inventor: John Rotondo, Murray Hill, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 700 days.

(21) Appl. No.: 12/632,074

(22) Filed: Dec. 7, 2009

(65) Prior Publication Data

US 2011/0137842 A1 Jun. 9, 2011

(51) Int. Cl.
*G06N 5/00* (2006.01)

(52) U.S. Cl.
USPC .......................................................... 706/45

(58) Field of Classification Search
USPC .......................................................... 706/45
See application file for complete search history.

(56) References Cited

U.S. PATENT DOCUMENTS

2007/0297585 A1* 12/2007 Karlsson et al. ......... 379/114.28

OTHER PUBLICATIONS

Loh et al ("Split Selection Methods for Classification Trees" 1997).*
Worth et al ("The use of discriminant analysis, logistic regression and classification tree analysis in the development of classification models for human health effects" 2002).*
U.S. Appl. No. 12/490,622 to I. Dan Melamed et al., filed Jun. 24, 2009.

* cited by examiner

*Primary Examiner* — Lut Wong
(74) *Attorney, Agent, or Firm* — Greenblum & Bernstein, P.L.C.

(57) ABSTRACT

A method for using predictive modeling of a physical process in order to determine and implement a solution to the physical process. The method includes analyzing the physical process to determine the relevant physical relationships, observations, data, and outcome probabilities associated with the physical relationships of the physical process, and storing representations of the relevant physical relationships, observations, data and outcome probabilities in a memory of a computer. The method also includes recursively analyzing the stored representations by the computer, and generating at least one tree structure that models the physical process, the tree structure including at least one root node, a plurality of decision nodes, and a plurality of end nodes. The method further includes partitioning observations at each decision node into probable outcomes using target partitioning, generating a plurality of other decision nodes based on the target partitioning, determining a solution to the physical process based on criterion variables, by the computer using the tree structure of the physical process to arrive at an end node, and implementing a physical solution to the physical process.

20 Claims, 5 Drawing Sheets

METHOD FOR CONSTRUCTING A TREE OF LINEAR CLASSIFIERS TO PREDICT A QUANTITATIVE VARIABLE

BACKGROUND

1. Field of the Disclosure

The present disclosure relates to the field of general predictive modeling of a physical process. More particularly, the present disclosure relates to a method, device, and computer readable medium for using predictive modeling of a quantitative variable measured on a physical, economic, social, or psychological process or state of affairs, using a tree based approach and target partitioning of decision nodes.

2. Background Information

General predictive modeling enables a user to utilize computer technology to represent and analyze a physical process, non-physical process, or state of affairs. The resulting analysis assists the user in rendering more advantageous decisions affecting the process or state of affairs.

DETAILED DESCRIPTION

In view of the foregoing, the present disclosure, through one or more of its various aspects, embodiments and/or specific features or sub-components, is thus intended to bring out one or more of the advantages as specifically noted below.

According to an embodiment of the present disclosure, a method is provided for using predictive modeling of a physical process in order to determine and implement a solution to the physical process. The method analyzes the physical process to determine the relevant physical relationships, observations, data, and outcome probabilities associated with the physical relationships of the physical process. The method also stores representations of the relevant physical relationships, observations, data and outcome probabilities in a memory of a computer. The method further recursively analyzes the stored representations by the computer, and generates at least one tree structure that models the physical process, the tree structure including at least one root node, a plurality of decision nodes, and a plurality of end nodes, wherein the analyzing and generating include partitioning observations at each decision node into probable outcomes using target partitioning, and generating a plurality of other decision nodes based on the target partitioning. The method determines a solution to the physical process based on criterion variables, by the computer using the tree structure of the physical process to arrive at an end node; and implements a physical solution to the physical process, the physical solution being based on the determined optimal solution.

In another embodiment of the method, a final predicted target partitioning is based on a linear discriminant analysis on predictor variables on all target partitions at each decision node.

In a further embodiment of the method, a predicted target partitioning of observations at decision nodes is based upon multiple predictor variables, rather than on a single predictive variable.

In an embodiment of the method, a minimum size limitation is imposed on each group of probable outcomes of an observation at each decision node.

In another embodiment of the method, implementing the physical solution includes reconfiguring cell phone subscriber services in a telecommunications network.

In a further embodiment of the method, all predictor variables at each decision node are tested one at a time to determine which single predictor variable produces a best discrimination between groups and to retain the single predictor variable as the first variable in the discrimination model for a partitioning.

In an embodiment, the method searches among all remaining predictor variables in subsequent iterations for a next best predictor variable in each iteration to add to a linear discriminant model that includes variables retained in previous iterations, and continuing until no remaining variable significantly adds to a discriminating power of the linear discriminant model.

In another embodiment of the method, a particular decision node is converted to an end node when none of the tested predictor variables at the particular decision node produces a substantial discrimination.

In a further embodiment of the method, the physical process relates to telecommunications using a telecommunications network.

In an embodiment of the method, implementing the physical solution includes reconfiguring at least one operation of the telecommunications network to accommodate predicted telecommunication service subscriber usage patterns.

In another embodiment, a computer system uses predictive modeling of a physical process in order to determine and implement a solution to the physical process. The computer system includes a user interface that enables a user to enter representations of relevant physical relationships, observations, data, and outcome probabilities associated with the physical relationships of the physical process, into the computer system; and a memory for storing the representations of the relevant physical relationships, observations, data and outcome probabilities. The computer system also includes a data processor to recursively analyze the stored representations, and to generate at least one tree structure that models the physical process, the tree structure including at least one root node, a plurality of decision nodes, and a plurality of end nodes, wherein the data processor partitions observations at each decision node into probable outcomes using target partitioning, generates a plurality of other decision nodes based on the target partitioning, and determines a solution to the physical process based on criterion variables, by the data processor using the tree structure of the physical process to arrive at an end node. The computer system further includes an output terminal for visually displaying the determined solution for the physical process to the user, for implementation of a physical solution to the physical process.

In a further embodiment of the computer system, a final predicted target partitioning is based on a linear discriminant analysis on predictor variables on all target partitions at each decision node.

In an embodiment of the computer system, a predicted target partitioning of observations at decision nodes is based upon multiple predictor variables, rather than on a single predictive variable.

In another embodiment of the computer system, a particular decision node is converted to an end node when none of the tested predictor variables at the particular decision node produces a substantial discrimination.

In a further embodiment of the computer system, the physical process relates to telecommunications using a telecommunications network.

In an embodiment, a computer readable medium is encoded with an executable computer program for using predictive modeling of a physical process in order to determine and implement a solution to the physical process. The computer readable medium includes an analyzing segment for analyzing the physical process to determine the relevant physical relationships, observations, data, and outcome probabilities associated with the physical relationships of the physical process; and a storing segment for storing representations of the relevant physical relationships, observations, data and outcome probabilities in a memory of a computer. The computer readable medium also includes a recursive and generating segment for recursively analyzing the stored representations by the computer, and generating at least one tree structure that models the physical process, the tree structure including at least one root node, a plurality of decision nodes, and a plurality of end nodes, wherein the recursive and generating segment further includes a partitioning segment for partitioning observations at each decision node into probable outcomes using target partitioning, and a node generating segment for generating a plurality of other decision nodes based on the target partitioning. The computer readable medium further includes a determining segment for determining a solution to the physical process based on criterion variables, by the computer using the tree structure of the physical process to arrive at an end node; and a display segment for displaying the determined solution for the physical process to the user, for implementation of a physical solution to the physical process.

In an another embodiment of the computer readable medium, a final predicted target partitioning is based on a linear discriminant analysis on predictor variables on all target partitions at each decision node.

In a further embodiment of the computer readable medium, a predicted target partitioning of observations at decision nodes is based upon multiple predictor variables, rather than on a single predictive variable.

In an embodiment of the computer readable medium, a particular decision node is converted to an end node when none of the tested predictor variables at the particular decision node produces a substantial discrimination.

In another embodiment of the computer readable medium, the physical process relates to telecommunications using a telecommunications network.

Figure 1:
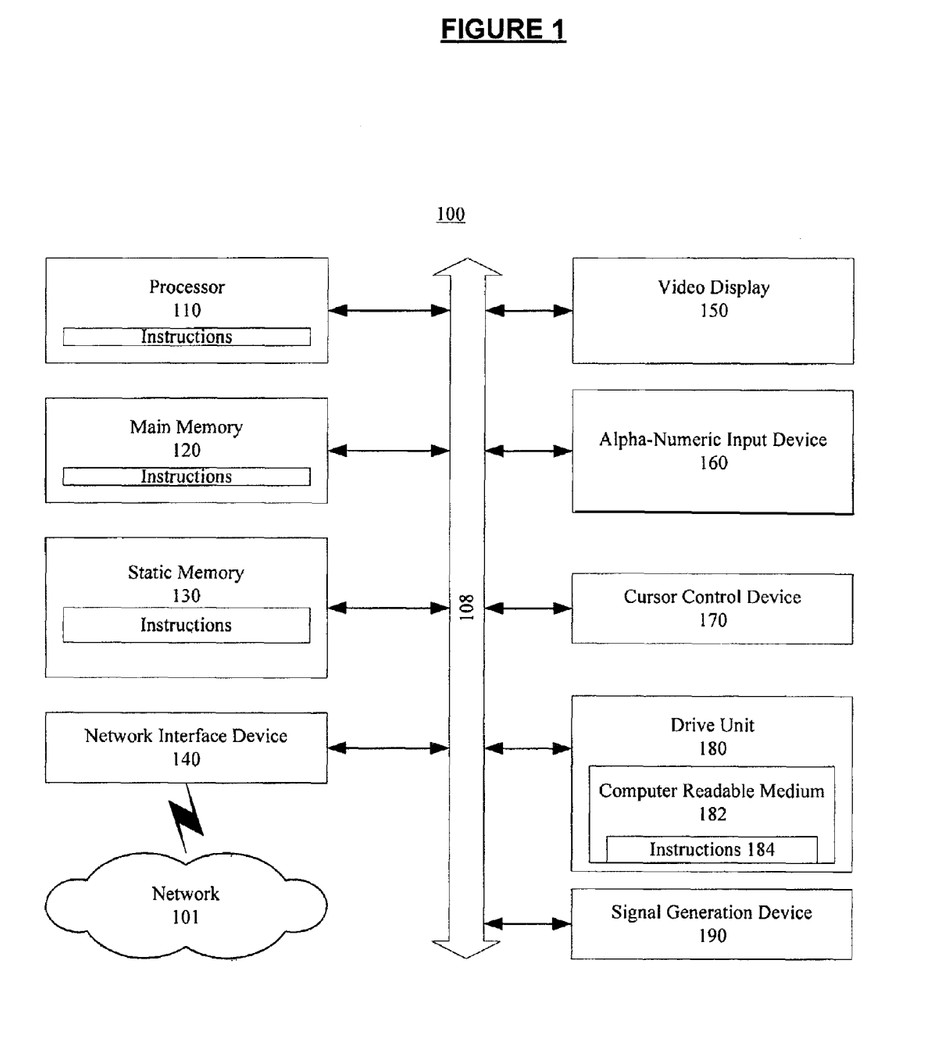
FIG. 1 shows an exemplary general computer system that includes a set of instructions for using predictive modeling of a process or state of affairs.

FIG. 1 is an illustrative embodiment of a general computer system, on which a method using predictive modeling of a process that utilizes target partitioning of decision nodes can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

In general, the particular form of predictive modeling described herein utilizes a tree-based approach involving target partitions of decision nodes. While this particular form of predictive modeling is similar to regression trees and random forests, this particular form of predictive modeling differs significantly from these approaches in how the set of individual observation vectors at a decision node in a tree are partitioned to create "child" decision nodes.

Linear discriminant analysis is used at each decision node in order to find the linear combination of predictor variables used to partition the decision node into two groups. The key concept is the application of linear discriminant analysis to a special set of a priori partitionings of the node called "target partitionings" in order to determine the partitioning that will be used for prediction. The set of target partitionings at a decision node is the set of all two-fold partitionings of the cases at the node that can be generated by choosing any split point P on a criterion variable Y (the variable to be predicted) and assigning all cases for which Y>P to one group, and all remaining cases to the other group.

If, among all the cases at a decision node, the criterion variable assumes n distinct variables, then there are n−1 distinct target partitionings. By construction, the two groups in any target partitioning are well separated on the criterion variable, in the sense that all the values of the criterion variable associated with the cases in one group are larger that all the values of the criterion variable for the cases in the other group. In any target partitioning of a node, the group with the higher values on the criterion variable will be called the HI group of the target partitioning, and the group with the lower values on the criterion variable will be called the LO group of the target partitioning.

There is also a stronger sense in which the set of target partitionings of a node contains all the best (most well-separated) partitionings. Consider all two-fold partitionings of the observations at a target node. Let m denote the number of observations in the smaller group of a partitioning if the two groups differ in size. If both groups are of equal size, then let m denote the number of observations in (either) one of the groups. Call m the order of the partitioning. Possible values of m range from 1 to n/2 for n even, and from 1 to (n−1)/2 for n odd. It can be shown that, among all possible order m 2-fold partitionings of the observations at a node, the set of a target partitionings for the node will contain an order m partitioning that maximizes the difference between the means of the two groups, and minimizes the sum over the two groups of the within-group sum of squared deviations from the group mean. This result holds for each possible value of m.

Target partitionings are a priori partitionings of the observations at a node which are distinguished by the high degree of group separation they exhibit. They serve two key roles in the methodology. First they provide labeled cases (assign observations to known groups) to which standard classification or discriminant models may be fit, e.g. Fisherian Linear Discriminant Analysis. Second, they provide desirable targets (in terms of group separation) toward which the modeling solutions will be pushed as a result of the model fitting procedure.

The method for partitioning the observations at a node is to perform a step-up two-class discriminant analysis on each target partitioning (provided the number of cases at the node and in the smaller group of the target partitioning is not too small to support the analysis), and choose the solution (the predicted partitioning) which minimizes the sum over the two groups of the within-group sum of squared deviations from the group mean on the criterion variable (denoted SWGSS). The cases at the node are then split into two groups in accordance with the best predicted partitioning, spawning two "child" decision nodes.

Two-class Fisherian Linear Discriminant Analysis is mathematically equivalent to an ordinary least squares linear regression analysis with class membership of the cases coded as +1 for one class and 0 for the other class. Consequently, two-class step-up discriminant analysis is equivalent to a step-up linear regression analysis with the two classes coded as +1 and 0. In the implementation of the partitioning method, the step-up regression equivalent of two-class step-up Fisherian Linear Discriminant Analysis is used.

Provided that the number of observations at a node is not less than a user-specified number $N_{min}$, a step-up linear regression analysis is performed on each target partitioning of the node for which the number of observations in the smaller group the target partitioning is not less than a user-specified number $n_{min}$. In the step-up regression analysis of a given target partitioning, the cases in the HI group of the target partitioning are numerically coded as +1 and the cases in the LO group are coded as 0. The step-up linear regression procedure first fits a constant term only model to the HI(+1) and LO(0) group codings of the cases. Then, it searches over all the available predictor variables to find the single predictor variable, which when added to the current model (a constant term), best predicts the case codings (i.e., yields the lowest residual sum of squares). If the predictor variable found in the first pass over all available predictor significantly reduces the residual sum of squares relative to the residual sum of squares for the constant only model, then that predictor variable is retained in the model. If the predictor variable found in the first pass is retained, the procedure makes a pass through the remaining predictor variable to find the one, which when added to the current model, gives the best predictions of the case codings. The process of adding additional variables to the model continues in like fashion until no remaining predictor variable can be found that, when added to the current model, will significantly reduce the residual sum of squares relative to that of the current model.

The final model produced by the step-up linear repression analysis on a given target partitioning is some linear combination L of the predictor variables that may include an additive constant or is just a constant by itself If the final model for a given target partitioning is a constant, nothing further is done with that target partitioning. Otherwise, the predicted value of the class coding for a given case is obtained by calculating the value of L for that case. To predict whether a case belong to the HI group or LO group, a split point, say P, on L is chosen and if L>P for the case, then the case is predicted to belong to the HI group of the target partitioning. If L≤P, the case is predicted to belong to the LO group. A search is performed over possible split points on L for a split point that minimizes SWGSS on the criterion variable Y. Using that split point, cases are assigned to the HI group or LO group. The partitioning of cases resulting from this procedure will be called the "best" predicted partitioning for the given target partitioning.

Using the procedure described above, a best predicted partitioning is found for each target partitioning of a node for which the final step-up regression model is not a constant. Suppose there are k≥1 target partitionings in which the final step-up regression model is not a constant and for which we have found best predicted partitionings. Of these k best predicted target partitionings, the one with the smallest SWGSS on the criterion variable Y will be called the "best" predicted partitioning for the node. Finally, the observations at the node are partitioned into two groups using the best predicted partitioning for the node.

More particularly, in this particular form of analysis, all observations are represented by a root node of a tree model. The analysis generates a binary tree by splitting the observations into two groups, and then splitting each of the resulting groups into two groups, etc., until a stopping criterion is met independently along each branch of the tree model. A summary of the steps of in constructing a binary regression tree using the proposed partitioning method is as follows:

1. Start with the set of all observations (the root node of the tree) and proceed recursively;
2. For each remaining untreated node perform the following steps:
3. If the number of observation at the node is less than $N_{min}$ then compute and retain the mean of the observations (the node becomes a terminal node of the tree) and end further treatment of the node;
4. Otherwise, for each target partitioning of the node:
5. If the number of observations in the smallest cell of the target partitioning is not less than $n_{min}$, then:
6. Perform a two-class step-up linear regression analysis on the numerical codings of the cases in the HI(+1) and LO(0) groups of the target partitioning, and temporarily retain the resulting final linear model L;
7. If the final step-up linear regression model L for the target partitioning is a constant (i.e., does not include at least one predictor variable), eliminate the target partitioning and model from further consideration;
8. Otherwise,
9. Calculate the value predicted by L for each case at the node;
10. Search over split points to find the split point P on L that minimizes SWGSS on the criterion variable Y;
11. Temporarily retain the model L and split point P that minimizes SWGSS on the criterion variable Y;
12. If no target partitioning of the node has a cell with at least $n_{min}$ observations, then compute and retain the mean of the observations at the node (the node becomes a terminal node);
13. If no target partitioning has a final stepwise regression model that includes at least one predictor variable, then compute and retain the mean of the observations at the node (the node becomes a terminal node);
14. Otherwise,
15. Search over all the retained models and split points associated with the target partitionings of the node to find the model and split point, call it $(L_0, P_0)$ which has the smallest SWGSS among all retained models and split points;
16. Partition the observations at the node into two groups (child nodes) using $(L_0, P_0)$ and permanently retain $(L_0, P_0)$ with the node;
17. End recursion.

Each non-terminal node of the resulting tree has an associated linear model and split point, which provides the rule by which an observation (case) is assigned to one of its two child nodes. Each terminal node has an associated mean value on the quantitative criterion variable Y which serves as the predicted value of Y for any observation (case) that is assigned to that terminal node. To obtain the predicted vale for an observation (case) that was not used in constructing the tree, the observation is put down the tree starting with the root node and following the rules of assignment to child nodes, until it reaches a terminal node. The predicted value for the observation is the mean value of Y (calculated during tree construction) associated with the terminal node.

Conventional methods for tree pruning, tree cross-validation, or bagging are not described here, but may be applied in conjunction with the proposed tree construction method.

The proposed method of partitioning the observations at a node into two groups can be substituted for the native methods used in many deterministic tree regression models that produce binary trees. For example, it can be substituted into single tree, ensemble of trees, and random forest methods of regression tree construction.

The proposed method uses linear regression as part of the procedure for partitioning the observations at a node into two groups. The types of predictor variables that may be used in the linear regression are interval scale or ratio scale continuous variables, or categorical (nominal scale) variables. Ordered categorical variable may be used only if they are treated as unordered categorical variables. This section deals with the treatment of categorical predictor variables in linear regression. The usual method for coding a categorical predictor variable that has two categories for inclusion in a linear regression model is to create a dummy variable X that can assume two possible variables: X=1 if the case falls in category 1 of the categorical variable, and X=−1 if the case falls into category 2 of the categorical variable. Any coding scheme that that assigns distinct numerical values to the two categories works equally well. For a categorical variable the has n>2 categories, a typical approach is to create n−1 dummy variables $X_i$ for i=1, ..., n−1, where $X_i$=1 if the case falls in category i and $X_i$=0 if the case does not fall in category i. Other codings are also possible, but they all involve expanding the categorical variable into n−1 dummy variables. Three other methods for coding a categorical variable with more than two categories are described here. These methods are aimed at coding a categorical variable in a way that allows it to be treated like a single quantitative variable, and avoids expanding the variable into n−1 dummy variables.

Method 1. For a given target partitioning T at a given node S (which is associated with a subset of the observations), calculate $P(HI|C_i)$=proportion of the cases among those belonging to the ith category of categorical variable C which belong to the HI group of the target partitioning, i=1, ..., n. The calculation of these n quantities must be performed for each target partitioning T of given node S. References to S and T are omitted in the notation but, implicitly, quantities are calculated separately for each T of each S. For a given node S and target partitioning T, the value of a coded numerical variable $X_{Cj}$ corresponding to categorical variable C for all cases j falling into to category i of variable C is $P(HI|C_i)$, i.e., $X_{Cj}=P(HI|C_i)$ for all cases j falling into category i. If the linear model for target partitioning T is the best model for the node (has the lowest SWGSS), and includes the variable $X_{Cj}$, then the pairs (i, $P(HI|C_i)$.), i=1, ..., n, associated with target partitioning T must be stored with all other decision criteria for making decisions/splits at node S.

Method 2. For a given node S (which is associated with a subset of the observations/cases), calculate $\bar{x}|C_i$=the mean of the criterion variable among the cases at the node which belong to category i, i=1 . . . , n. The calculation of these n quantities must be performed at each node (but not for each target partitioning at each node). References to S in the above notation have been omitted, but implicitly, quantities are calculated separately for each S. For a given node, the value of the coded numerical variable corresponds to categorical variable C is $X_{Cj}=\bar{x}|C_i$ for all cases j that fall into category i. If the variable $X_{Cj}$ is included the final model for the node, the pairs (i, $\bar{x}|C_i$) i=1, n must be stored with all other decision criteria for making decisions/splits at the node. The coding method embodied in Method 2 has been used in regression trees methods that partition nodes based on the single best splitting variable for the node, but has not heretofore been used in linear regression.

Method 3. Consider the case having a categorical variable with a "large" number a categories. For nodes with a small number of observations, the number of observations falling into each category of the categorical variable may be low or zero, yielding poor estimates of the conditional probability $P(HI|C_i)$. One way to address this problem is to collapse the original set of categories down to a smaller set of categories. Below is a method for collapsing the original set to two categories and assigning a value to an associated binary random variable. For a given node S and target partitioning T, let $U_C$ be the subset of categories of categorical variable C in which $P(HI|C_i) \geq 0.5$. Define a binary random variable as follows:

$X_{Cj}=1$ if the category of variable C to which the j-th case (observation) belongs is a member of $U_C$; and $X_{Cj}=-1$ otherwise.

If the linear model for target partitioning T is the best model for the node (has the lowest SWGSS), and includes the variable $X_{Cj}$, then $U_C$ (the subset of categories of categorical variable C in which $P(HI|C_i) \geq 0.5$) associated with target partitioning T must be stored with all other decision criteria for making decisions/splits at node S.

Figure 2:
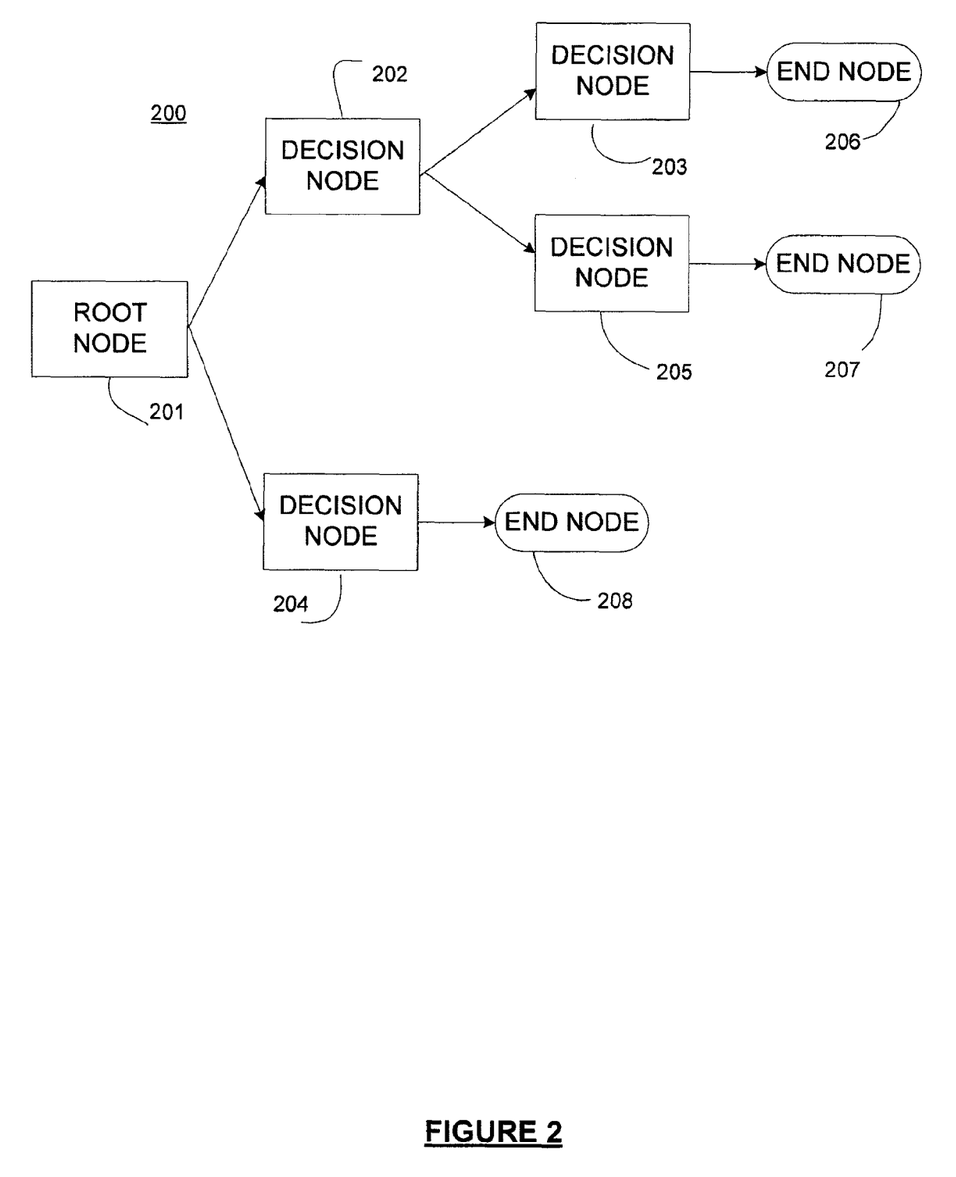
FIG. 2 is an exemplary illustration of a generated tree structure that models a process or state of affairs, according to an aspect of the present disclosure.

FIG. 2 is an exemplary illustration of a generated tree structure that models a physical process, according to an aspect of the present disclosure. In the illustration, a simplified generated tree structure is depicted. The tree structure originates with a root node 201, which also is the original decision node. By analyzing, using target partitioning, the stored representations of the relevant physical relationships, observations, data and outcome probabilities in a memory of a computer system, the data processor of the computer system originates the tree structure by generating two decision nodes 202 and 204 from root node 201.

As also illustrated in FIG. 2, the further analysis, using target partitioning, of the stored representations of the relevant physical relationships, observations, data and outcome probabilities can result in two more "child" decision nodes 203 and 205 from the decision node 202. Alternatively, the further analysis may result in the creation of end nodes, e.g., 206, 207, and 208, when none of tested predictor variables at a particular decision node produces a substantial discrimination.

Figure 3:
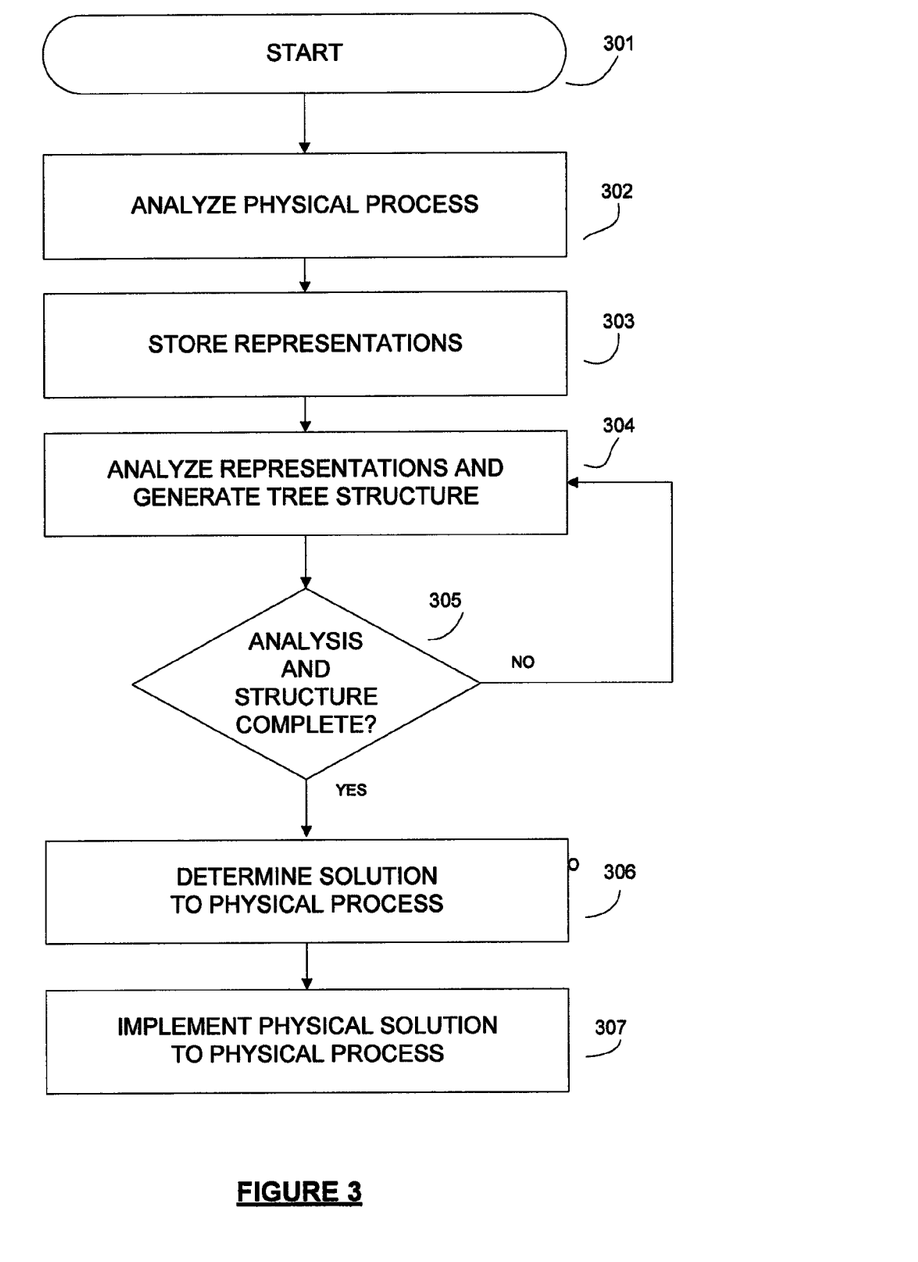
FIG. 3 is a flowchart illustrating the methodology using predictive modeling of a process or state of affairs, according to an aspect of the present disclosure.

FIG. 3 is a flowchart illustrating the methodology using predictive modeling of a physical process, according to an aspect of the present disclosure. In the flowchart, the method starts at 301, after which the physical process is analyzed at 302 to determine the relevant physical relationships, observations, data, and outcome probabilities associated with the physical relationships of the physical process. At 303, the representations of the relevant physical relationships, observations, data, and outcome probabilities associated with the physical relationships of the physical process are stored in a memory of a computer.

At 304, the stored representations are recursively analyzed and at least one tree structure that models the physical process is generated. The generated tree structure includes at least one root node, a plurality of decision nodes, and a plurality of end nodes. The recursive analysis and the generation of the tree structure includes partitioning observations at each decision node into probable outcomes using target partitioning, and generating a plurality of other decision nodes based on the target partitioning.

If the computer determines that the recursive analysis and tree structure generation are not yet completed, then the method returns to 304 to continue the analysis. On the other hand, if the computer determines that the recursive analysis and tree structure generation are completed, then the computer proceeds to 306 wherein a solution to the physical process is determined by the computer using the generated tree structure of the physical process. The method then concludes with the implementation of the physical solution to the physical process that is based on the determined solution.

Accordingly, the present invention uses a particular type of predictive modeling that utilizes target partitioning at decision nodes. The physical processes to which the present invention can be applied are many. Some non-exhaustive examples of such physical processes include the optimization of telecommunication strategies, including strategies related to telecommunication network configuration expansions, deployments, and upgrades; telecommunication operational strategies, including strategies related to levels of telecommunication services; financial management programs, including programs relating to revenue sources, customer acquisition, customer retention, and marketing strategies. Other examples include: (a) the prediction of a customer's total spending on telecommunications across carriers; (b) the prediction of a customer's change in telecommunications spending and usage volume as a result of a price change; (c) the prediction of the number of new cell phone subscribers within a business in a give period of time; (d) the prediction of the number of cell phone subscribers within a business that will cancel their service subscription in a given period of time; (e) the prediction of a customer's growth in wireless data usage in a given period of time; and (f) the prediction of a customer's spending and usage volumes on a new telecommunication service or feature in a given period of time.

Figure 4:
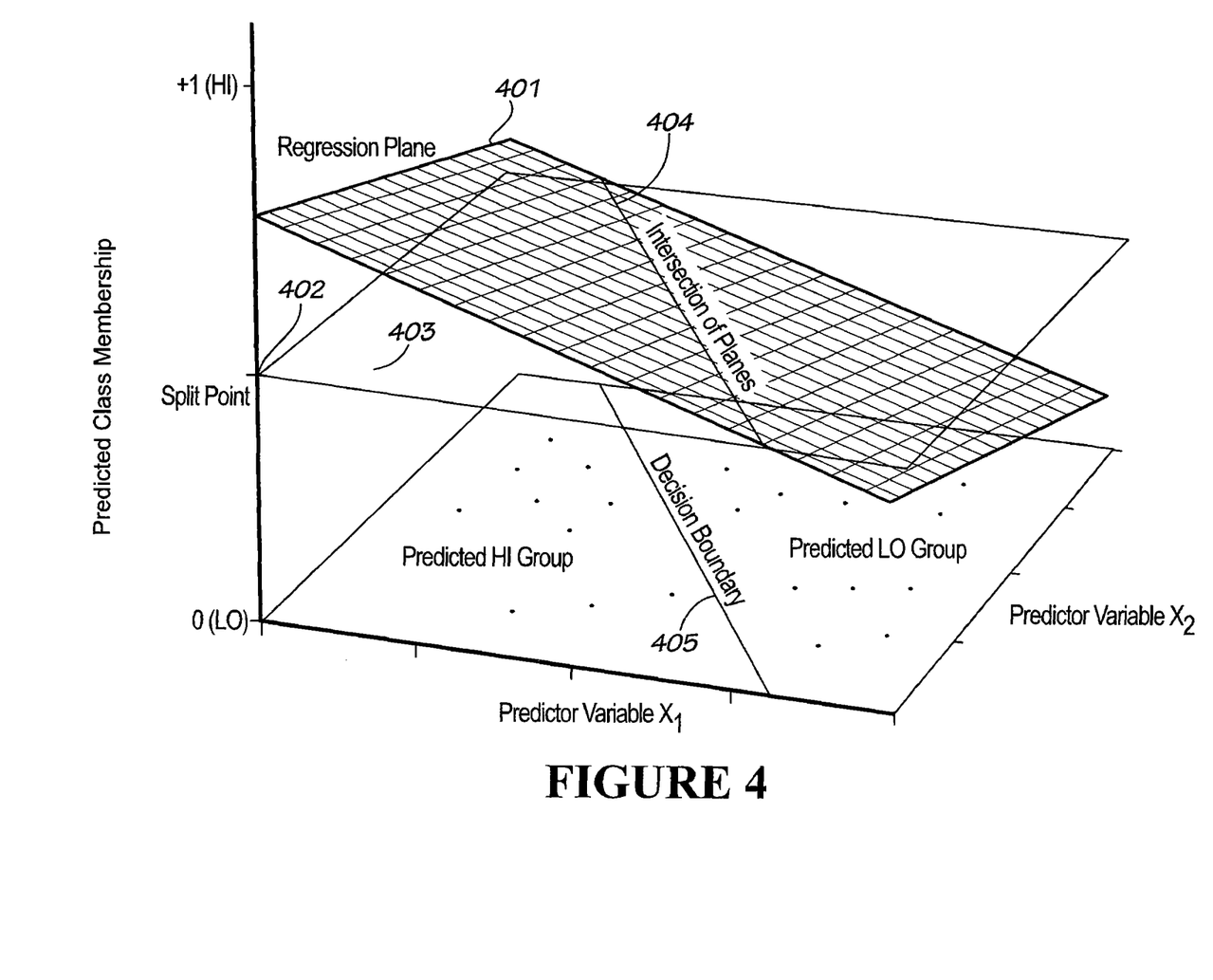
FIG. 4 is a geometric depiction of exemplary results of a step-up regression analysis on a target partitioning of the observations at a tree node.

FIG. 4 is a geometric depiction of exemplary results of a step-up regression analysis on a target partitioning of the observations at a tree node. Reference 401 shows the regression plane generated by the linear model resulting from the step-up regression. The height of the regression plane over any point in the (hyper)plane of predictor variables gives the predicted value of the HI(+1)/LO(0) group coding for that point. 402 shows the optimal (minimizes SWGSS on the criterion variable Y) split point P for assigning observations (cases) to the HI or LO group of the target partitioning. If the predicted value for a case is greater than P, the case is assigned to the HI group. Otherwise, the case is assigned to the LO group. Reference 403 shows the (hyper)plane at the height of the split point P, which is parallel to the (hyper)plane of predictor variables.

The intersection of this plane 403 with the regression plane 402 is the line 404 (or an n−1 dimensional hyper plane, if there are n predictor variables in the linear model). All points in the regression plane 402 that fall on one side of the line 404 are higher than split point P, and all points on the other side of the line are below split point P. Line 405 is the projection of the line 404 into the plane of the predictor variables. Line 405 is the decision boundary. Any observation that falls on one side of the line 405 is assigned to the HI group, and any observation that fall on the other side of line 405 is assigned to the LO group. The same analysis is performed on all target partitionings of the node that meets a minimal requirement on the number of cases in the smaller group of the partitioning. The solution for HI and LO group assignments that minimizes the SWGSS on the criterion variable Y (the quantitative variable to be predicted) is selected as the "best" predicted partitioning of the node. Finally, the node is partitioned using the decision boundary that yields the best predicted partitioning.

Figure 5:
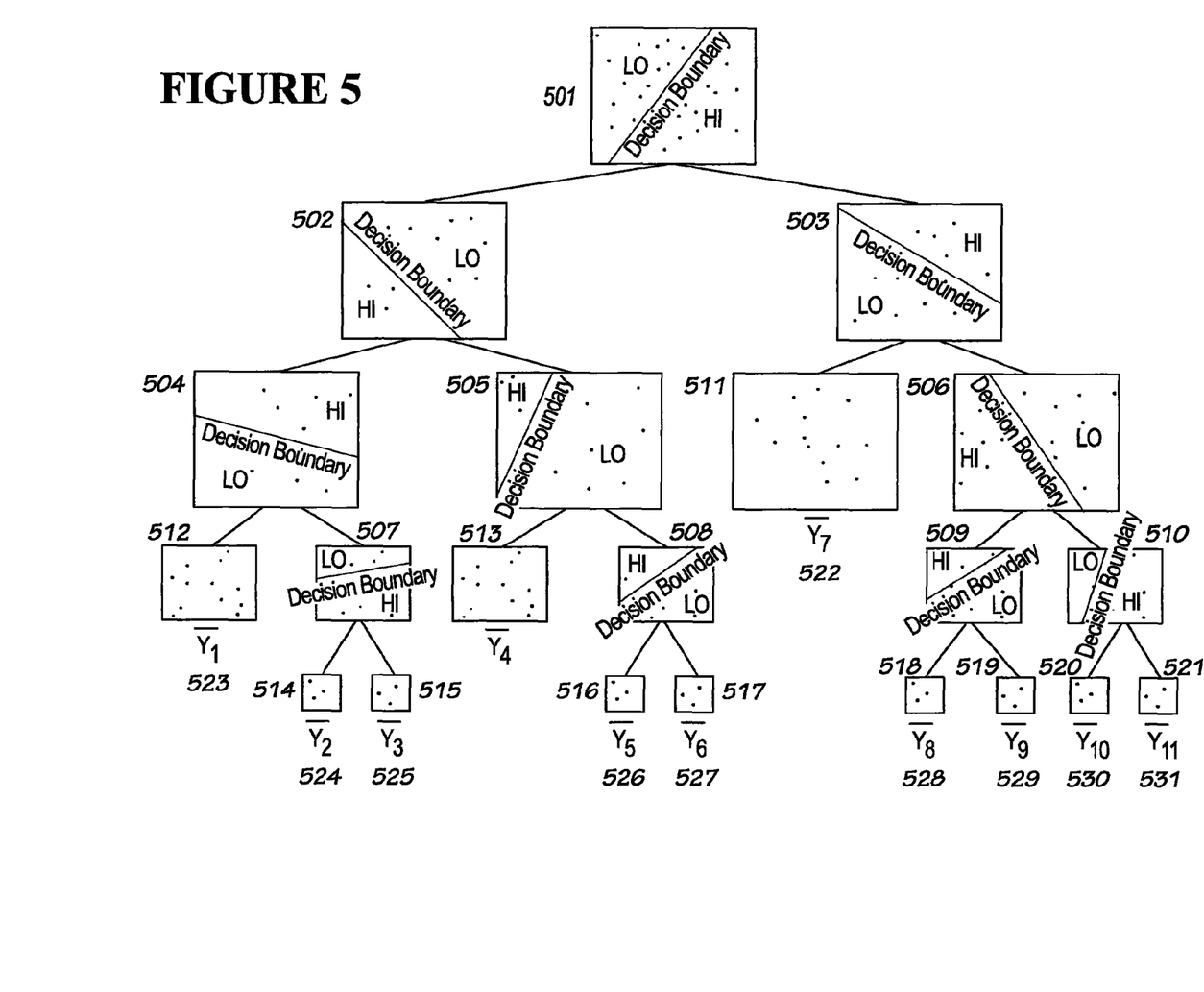
FIG. 5 depicts an exemplary regression tree resulting from the proposed method for predicting a quantitative variable Y.

FIG. 5 displays an exemplary regression tree resulting from the proposed method for predicting a quantitative variable Y. Root node 501 show the observations (in the plane of the predictor variables) at the root node and the decision boundary separating the predicted HI group from predicted LO group. Using the decision boundary, the observations at the root node are then split into two child nodded nodes, 502 and 503, each of which are, in turn, split into two groups. Below the root node, nodes 502-510 are all non-terminal nodes, each of which has its own decision boundary for generating further splits. Nodes 511-521 are all terminal nodes of the tree which are not further split. At each terminal node, the mean of the observations on criterion variable Y is calculated. References 522-531 are the mean values of Y at the terminal nodes. The mean value at a terminal node is the predicted value of Y for any case that is assigned to that terminal node.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for using predictive modeling of a physical process in order to determine and implement a solution to the physical process, the method comprising:

analyzing the physical process to determine relevant physical relationships, observations, data, and outcome probabilities associated with the physical relationships of the physical process;

storing representations of the relevant physical relationships, observations, data and outcome probabilities in a memory of a computer;

recursively analyzing the stored representations by the computer, and generating at least one tree structure that models the physical process, the tree structure including at least one root node, a plurality of decision nodes, and a plurality of end nodes, wherein the analyzing and generating include partitioning observations at each decision node into probable outcomes using target partitioning, and generating a plurality of other decision nodes based on the target partitioning, and wherein when the target partitioning of a decision node does not achieve a predetermined minimum number of observations, determining a mean of the observations, retaining the mean of the observations at the decision node, and converting the decision node into an end node;

determining a solution to the physical process based on criterion variables, by the computer using the tree structure of the physical process to arrive at an end node; and implementing a physical solution to the physical process, the physical solution being based on the determined solution.

2. The method of claim 1, wherein a final predicted target partitioning is based on a linear discriminant analysis on predictor variables on all target partitions at each decision node.

3. The method of claim 2, wherein a predicted target partitioning of observations at decision nodes is based upon multiple predictor variables, rather than on a single predictive variable.

4. The method of claim 3, wherein a minimum size limitation is imposed on each group of probable outcomes of an observation at each decision.

5. The method of claim 3, wherein implementing the physical solution includes reconfiguring cell phone subscriber services in a telecommunications network.

6. The method of claim 3, wherein all predictor variables at each decision node are tested one at a time to determine which single predictor variable produces a best discrimination between groups and to retain the single predictor variable as the first variable in the discrimination model for a partitioning.

7. The method of claim 6, further comprising searching among all remaining predictor variables in subsequent iterations for a next best predictor variable in each iteration to add to a linear discriminant model that includes variables retained in previous iterations, and continuing until no remaining variable significantly adds to a discriminating power of the linear discriminant model.

8. The method of claim 3, wherein a particular decision node is converted to an end node when none of the tested predictor variables at the particular decision node produces a predetermined discrimination.

9. The method of claim 1, wherein the physical process relates to telecommunications using a telecommunications network.

10. The method of claim 9, wherein implementing the physical solution includes reconfiguring at least one operation of the telecommunications network to accommodate predicted telecommunication service subscriber usage patterns.

11. A computer system for using predictive modeling of a physical process in order to determine and implement a solution to the physical process, the computer system comprising:

a user interface that enables a user to enter representations of relevant physical relationships, observations, data, and outcome probabilities associated with the physical relationships of the physical process, into the computer system;

a memory for storing the representations of the relevant physical relationships, observations, data and outcome probabilities;

a data processor to recursively analyze the stored representations, and to generate at least one tree structure that models the physical process, the tree structure including at least one root node, a plurality of decision nodes, and a plurality of end nodes, wherein the data processor partitions observations at each decision node into probable outcomes using target partitioning, generates a plurality of other decision nodes based on the target partitioning, and determines a solution to the physical process based on criterion variables, by the data processor using the tree structure of the physical process to arrive at an end node; and an output terminal for visually displaying the determined solution for the physical process to the user, for implementation of a physical solution to the physical process, wherein when the target partitioning of a decision node does not achieve a predetermined minimum number of observations, determining a mean of the observations, retaining the mean of the observations at the decision node, and converting the decision node into an end node.

12. The computer system of claim 11, wherein a final predicted target partitioning is based on a linear discriminant analysis on predictor variables on all target partitions at each decision node.

13. The computer system of claim 12, wherein a predicted target partitioning of observations at decision nodes is based upon multiple predictor variables, rather than on a single predictive variable.

14. The computer system of claim 13, wherein a particular decision node is converted to an end node when none of the tested predictor variables at the particular decision node produces a predetermined discrimination.

15. The computer system of claim 11, wherein the physical process relates to telecommunications using a telecommunications network.

16. A non-transitory computer-readable storage medium encoded with an executable computer program for using predictive modeling of a physical process in order to determine and implement a solution to the physical process and that, when executed by a processor, causes the processor to perform operations comprising:

analyzing the physical process to determine relevant physical relationships, observations, data, and outcome probabilities associated with the physical relationships of the physical process;

storing representations of the relevant physical relationships, observations, data and outcome probabilities in a memory of a computer;

recursively analyzing the stored representations by the computer, and generating at least one tree structure that models the physical process, the tree structure including at least one root node, a plurality of decision nodes, and a plurality of end nodes, wherein the recursively analyzing the stored representations further includes a partitioning observations at each decision node into probable outcomes using target partitioning, and generating a plurality of other decision nodes based on the target partitioning, and wherein when the target partitioning of a decision node does not achieve a predetermined minimum number of observations, determining a mean of the observations, retaining the mean of the observations at the decision node, and converting the decision node into an end node;

determining a solution to the physical process based on criterion variables, by the computer using the tree structure of the physical process to arrive at an end node; and displaying the determined solution for the physical process to the user, for implementation of a physical solution to the physical process.

17. The non-transitory computer-readable storage medium of claim 16, wherein a final predicted target partitioning is based on a linear discriminant analysis on predictor variables on all target partitions at each decision node.

18. The non-transitory computer-readable storage medium of claim a 17, wherein a predicted target partitioning of observations at decision nodes is based upon multiple predictor variables, rather than on a single predictive variable.

19. The non-transitory computer-readable storage medium of claim 18, wherein a particular decision node is converted to an end node when none of the tested predictor variables at the particular decision node produces a predetermined discrimination.

20. The non-transitory computer-readable storage medium of claim 16, wherein the physical process relates to telecommunications using a telecommunications network.

\* \* \* \* \*